(12) United States Patent
Athalye et al.

(10) Patent No.: US 10,375,209 B2
(45) Date of Patent: *Aug. 6, 2019

(54) SECURE BOOT DOWNLOAD COMPUTATIONS BASED ON HOST TRANSPORT CONDITIONS

(71) Applicant: Intel IP Corporation, Santa Clara, CA (US)

(72) Inventors: Sachin V. Athalye, Singapore (SG); Venkatesh S. Obanaik, Singapore (SG); Sowjanya Reddy, Singapore (SG)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,030

(22) Filed: Sep. 5, 2017

(65) Prior Publication Data
US 2018/0124211 A1 May 3, 2018

Related U.S. Application Data

(63) Continuation of application No. 14/715,767, filed on May 19, 2015, now Pat. No. 9,756,146.

(51) Int. Cl.
*H04L 29/08* (2006.01)
*H04L 9/32* (2006.01)
*G06F 21/57* (2013.01)

(52) U.S. Cl.
CPC ............ *H04L 67/34* (2013.01); *G06F 21/575* (2013.01); *H04L 9/3239* (2013.01); *H04L 9/3247* (2013.01)

(58) Field of Classification Search
None
See application file for complete search history.

(56) References Cited

U.S. PATENT DOCUMENTS 7,209,447 B1 *  4/2007  Marsh ............... H04L 29/06027
                                                 370/229
8,000,735 B1 *  8/2011  Barclay ................ H04W 88/02
                                                   455/418

(Continued)

OTHER PUBLICATIONS

Pannetrat, et al.: "Authenticating Real Time Packet Streams and Multicasts", Dec. 2001, pp. 1-15.

(Continued)

*Primary Examiner* — Umut Onat
(74) *Attorney, Agent, or Firm* — Grossman, Tucker, Perreault & Pfleger, PLLC (57) ABSTRACT

Systems, methods and computer readable media enable secure patch downloading from a host to a target with improved security computation operations based on transport conditions. The method may include receiving a packet of the patch from the host; verifying that the packet is not a retransmission of a previously received packet; if the verification succeeds, performing a first type of security computation based on the packet; if the verification fails and the content of the packet differs from the content of the previously received packet, stopping further performance of the first type of security computation until a final packet of the patch is received; performing a second type of security computation based on one or more of the received packets; and determining a security status of the patch based on a comparison of the first type of security computation and the second type of security computation.

21 Claims, 10 Drawing Sheets

(56) References Cited

U.S. PATENT DOCUMENTS

| | | | | |
|---|---|---|---|---|
| 8,736,299 | B1* | 5/2014 | Pedersen | H03K 19/17768 326/8 |
| 2003/0056107 | A1* | 3/2003 | Cammack | G06F 21/10 713/189 |
| 2003/0126400 | A1* | 7/2003 | Debiez | G06F 21/64 711/216 |
| 2006/0023877 | A1* | 2/2006 | Tsuruga | H04L 9/0618 380/28 |
| 2007/0019543 | A1 | 1/2007 | Wei et al. | |
| 2007/0116282 | A1 | 5/2007 | Hawkes et al. | |
| 2007/0234134 | A1 | 10/2007 | Shao et al. | |
| 2008/0154805 | A1 | 6/2008 | Gurumoorthy et al. | |
| 2008/0172448 | A1* | 7/2008 | Wonus | G06F 9/4416 709/203 |
| 2008/0222414 | A1 | 9/2008 | Wang et al. | |
| 2010/0223457 | A1* | 9/2010 | Durham | H04L 63/0428 713/152 |
| 2011/0113181 | A1* | 5/2011 | Piwonka | G06F 8/65 711/102 |
| 2011/0258519 | A1 | 10/2011 | Leavens et al. | |
| 2012/0054535 | A1* | 3/2012 | Wong | H04L 63/126 714/4.1 |
| 2012/0151118 | A1 | 6/2012 | Flynn et al. | |
| 2012/0265959 | A1 | 10/2012 | Le et al. | |
| 2013/0054964 | A1 | 2/2013 | Messerges et al. | |
| 2013/0225284 | A1* | 8/2013 | Lenger | G06F 21/57 463/29 |
| 2013/0230060 | A1 | 9/2013 | Bernhard et al. | |
| 2014/0244966 | A1 | 8/2014 | Bosshart et al. | |
| 2015/0019856 | A1* | 1/2015 | Kim | G06F 21/575 713/2 |
| 2015/0019867 | A1* | 1/2015 | Rothstein | H04L 43/0823 713/168 |

OTHER PUBLICATIONS

Adb-Elrahman, et al.: "Hash Chain Links Resynchronization Methods in Video Streaming Security: Performance Comparison", 2015, pp. 1-12.

Office Action issued in U.S. Appl. No. 14/715,767, dated Aug. 24, 2016, 21 pages.

Notice of Allowance issued in U.S. Appl. No. 14/715,767, dated May 5, 2017, 48 pages.

* cited by examiner

SECURE BOOT DOWNLOAD COMPUTATIONS BASED ON HOST TRANSPORT CONDITIONS

CROSS-REFERENCE TO RELATED APPLICATION

The present application is a continuation of U.S. patent application Ser. No. 14/715,767 filed May 19, 2015, the entire disclosure of which is incorporated herein by reference.

FIELD

The present disclosure relates to secure boot downloads, and more particularly, to improved secure boot download computations based on transport conditions between a host and a target and on reporting of errors to the host.

BACKGROUND

System host platforms, for example, computing and communication platforms, may include multiple sub-systems or chips. These subsystems may include read only memory (e.g., ROM-based chips) to store software, firmware, data, etc., that may be used to boot up the subsystem and/or for any associated operations of that subsystem. Occasionally, updates to the ROM contents are required, for example to apply patches to the software or firmware to provide bug fixes or new features, or to adjust parameters. Patch downloads may be applied by the host to the chips as part of the boot up process for the chips. Typically, the host sends commands to the chip via some physical transport mechanism, where each command is associated with a packet of download patch content.

Some systems require a secure boot download, where each packet of the patch, as well as the entire patch, may be verified through the use of one or more encryption algorithms Because packets may be transmitted out of sequence and/or retransmitted multiple times, depending on conditions of the physical transport mechanism, the encryption calculations generally cannot be performed until the entire patch is downloaded, which is relatively inefficient.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for secure patch downloading from a host to a target, with improved security computation operations based on host transport conditions. The patch downloads may be, for example, boot patches for the targets. Embodiments also provide for error reporting to the host with improved security. The patches may include, for example, software, firmware, and/or other data. In some embodiments, the host may be a system platform and the target(s) may be one or more ROM based chips or subsystems of the platform.

The host may be configured to transmit one or more patches to the target, where each patch is partitioned into one or more packets that may be sized for efficient transmission based on transport conditions (e.g., error rates) and characteristics of the target, such as, for example the number and sizes of memory buffers. Packets may be downloaded out of sequence and may be retransmitted multiple times if errors occur. The target may be configured to perform security verification computations on the packets. These computations may include, for example, the Secure Hash Algorithm (SHA), which may be performed repeatedly, in a cumulative fashion based on each new packet that arrives. The target may also be configured to perform a security verification computation, such as, for example, the Rivest Shamir Adelman Algorithm (RSA), once for each patch download. The RSA and SHA computational results may be compared, after completion of the patch download, to authenticate the patch. As will be described in greater detail below, the SHA computations may be performed, based on previously received packets, in parallel with the reception of new packets (e.g., with at least some degree of temporal overlap), to improve download speed and efficiency.

Figure 1:
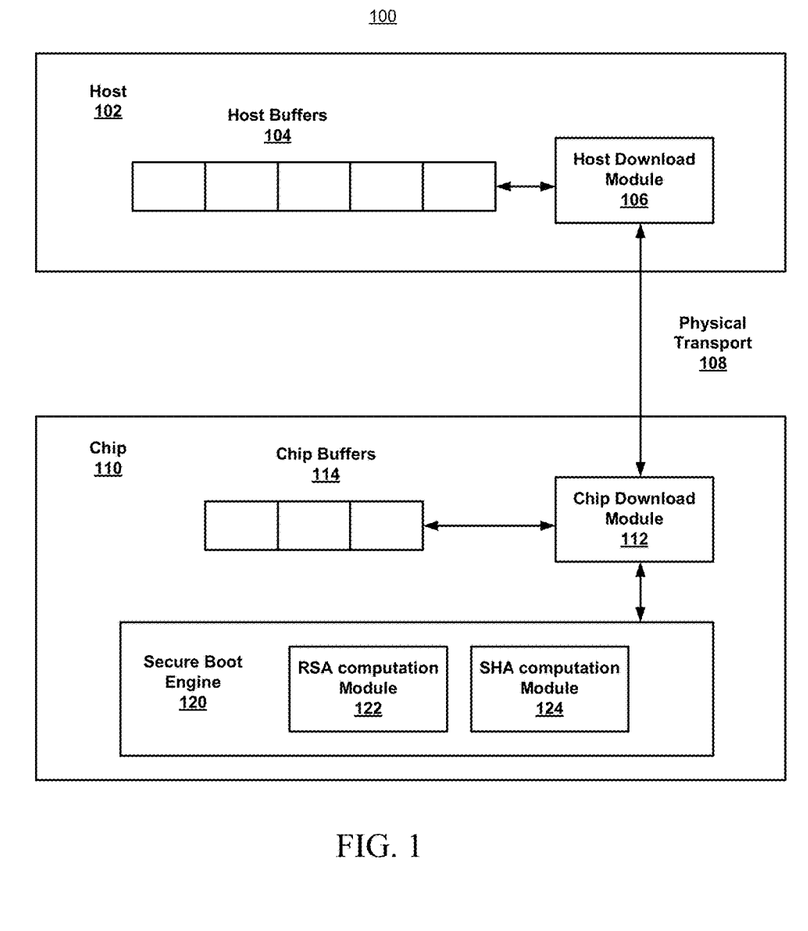
FIG. 1 illustrates a top level system diagram of an example embodiment consistent with the present disclosure.

FIG. 1 illustrates a top level system diagram 100 of one example embodiment consistent with the present disclosure. A host system or platform 102 is shown to include a host download module 106 and host buffers 104. The host buffers 104 may be configured to store the patch download, or portions thereof, for packetization and transmission to the target chip 110 by the host download module 106, as described below. In some embodiments, the host 102 may be, for example a computing or communication platform. A target Chip 110 is shown to include chip (or target) download module 112 and buffers 114. Chip buffers 114 may be configured to receive and store packets of the patch download that are received and managed by the chip download module 112, as described below. In some embodiments, the chip 110 may be, for example, a transceiver, a network interface or a Global Navigation Satellite System (GNSS) or any other suitable technology chipset. The chip 110 may further include one or more components or subcomponents (not shown), any of which may be configured to install a patch download from the chip download module 112.

A physical transport mechanism 108 may be configured to provide communication between the host 102 and the chip 110. The transport mechanism 108 may not necessarily provide error free communication. Communications may include download patch packets (e.g., transmitted from host to chip) and acknowledgments (e.g., transmitted from chip to host). Acknowledgements (or ACKs) may be used to indicate successful receipt of a packet that did not contain a transmission error. In some embodiments, the physical transport 108 may be, for example, a Universal Asynchronous Receiver/Transmitter (UART), a Serial Peripheral Interface (SPI), a Universal Serial Bus (USB) or an Inter-Integrated Circuit bus (I2C). Of course, any other suitable physical transport, existing or yet to be developed, may also be employed. In some embodiments, multiple physical transports 108 may be provided, for example, one transport for packet communication and a second transport for acknowledgments. In some embodiments, packets may be transmitted from the host over multiple physical transports (for example, in parallel) and aggregated on the chip side to achieve greater throughput than might otherwise be possible using a single physical transport. In some embodiments, the multiple physical transports may be configured to download patches for multiple components of the chip in parallel.

The chip 110 may further include a secure boot engine 120, including RSA computation module 122 and SHA computation module 124, configured to verify the received packets and the resulting composite patch using secure encryption, decryption and/or hashing techniques. These security techniques may include, for example, RSA, or any other suitable alternatives such as the Diffie-Hellman key exchange algorithm, the Digital Signature algorithm and the ElGamal signature algorithm. The security techniques may further include, for example, SHA (and variations SHA-1, SHA-2, etc.), or other suitable alternatives such as the RACE Integrity Primitives Evaluation Message Digest (RIPEMD)-160 hash function and the Message Digest 5 (MD5) algorithm.

Figure 2A:
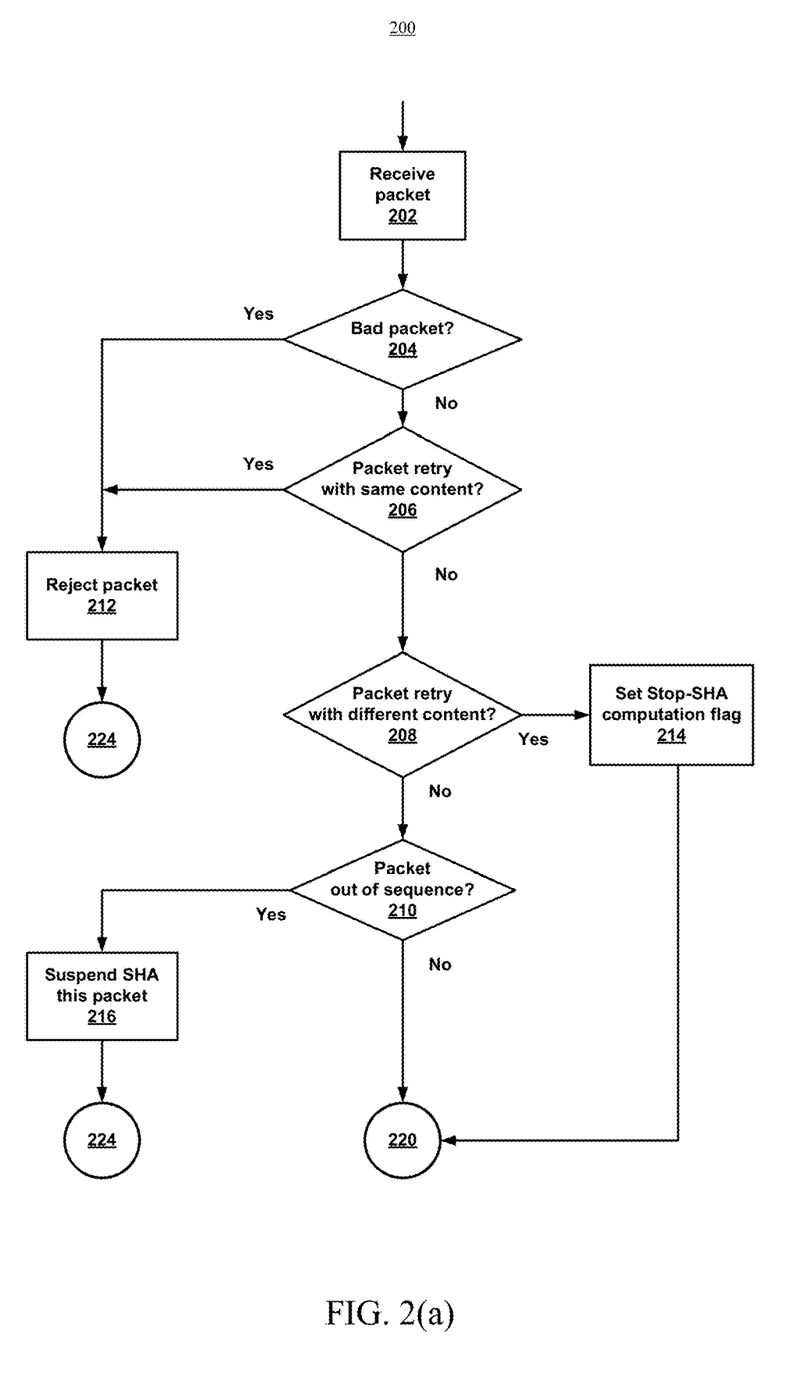
FIGS. 2(a) and 2(b) illustrate a flowchart of operations of one example embodiment consistent with the present disclosure.
Figure 2B:
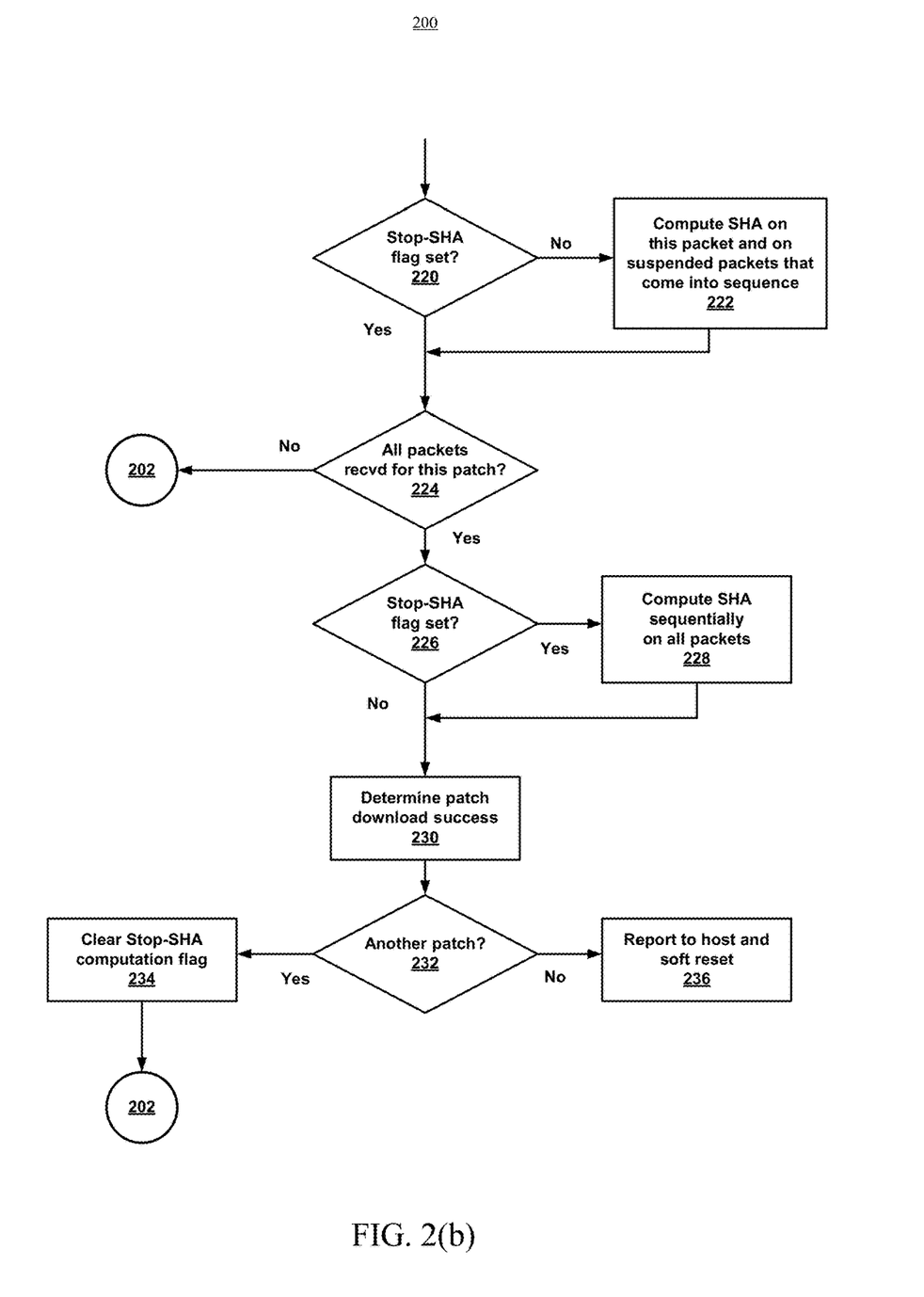

FIGS. 2(a) and 2(b) illustrate a flowchart of operations 200 of one example embodiment consistent with the present disclosure. These operations may be performed for one or more patch downloads from host 102 to chip 110. At operation 202, a packet is received by the chip 110, for example over physical transport 108. The packet may typically include a sequence number, or any other suitable mechanism to enable determination of the ordering of packets within a patch. The packet may also include a checksum, CRC or other error detection data that may be used to verify the validity of the packet. At operation 204, the packet is checked to determine validity. If the packet is bad (e.g., invalid), then the packet is rejected at operation 212. A bad packet may contain an error, for example, due to a transmission problem on the transport 108, and therefore the SHA computation is suspended for this packet at operation 216. In this case, the procedure continues at operation 220, described below.

Otherwise, at operation 206, the packet is checked to determine if it is a retransmission (retry) of a previously sent packet, and if it has identical content to the previous version. In some embodiments, a retransmission (or retry) may be detected by a duplicate sequence number (e.g., a packet with the same sequence number as a previously received packet). This may occur, for example, if an ACK for the previous valid packet was not correctly received by the host. If so, then since the previous packet was valid and used in the cumulative SHA computation, this retry packet is rejected, at operation 212, and the procedure continues at operation 224, described below.

Otherwise, at operation 208, the packet is checked to determine if it is a retransmission (retry) of a previously sent packet, and if the content differs from the previous packet. This may indicate, for example, that the previous packet was in error and the host retransmitted a corrected version. If so, the cumulative SHA computation, which was based in part on the previous bad packet, is now assumed to be in error and will be discarded. Thus, at operation 214, a "Stop-SHA computation" flag is set to prevent future SHA computation on each received packet, since they would also be invalid as an extension of the currently erroneous cumulative SHA computations. It will be appreciated that the Stop-SHA flag will have been initialized to a cleared state at the beginning of the patch download procedure. The retry packet, however, being valid, will be used for the download patch. In this case, the procedure continues at operation 220, described below.

Otherwise, at operation 210, the packet is checked to determine if it is out of sequence. This may happen, for example, when multiple physical transports are in use, sending packets in parallel, or for other reasons, and does not necessarily indicate an error. If the packet is out of sequence, then at operation 216, the SHA computation is temporarily suspended for that packet and it is set aside in memory for later SHA computation, at a point when that packet would correctly fit into the sequence of packets. With the out of sequence packet thus suspended, the procedure continues at operation 224, described below.

Otherwise, processing continues at operation 220 of FIG. 2(b), where the Stop-SHA flag is checked and, if not set, the SHA is computed for the current packet at operation 222. Also, at operation 222, the SHA may also be computed for any previously suspended, out of sequence packets, that can be fitted into the sequence of currently received packets. These SHA computations may be performed in parallel with the download of the next packet, for increased efficiency.

At operation 224, a determination is made as to whether all packets have been received for the patch that is currently being downloaded. If not, then the process loops back to operation 202, and a next packet is received. Otherwise, if the patch download has completed, the Stop-SHA flag is again checked at operation 226. If the Stop-SHA flag was set, indicating previous interruption of the SHA computations during packet downloads due to a packet retry with modified content, then, at operation 228, the SHA may now be computed sequentially on all the received packets (e.g., from first to last). Otherwise, the SHA will have already been computed in a cumulative fashion as each packet was received.

At operation 230, the success or failure of the patch download is determined. This may be accomplished by computing the RSA for the entire patch and comparing it against the SHA, which was cumulatively calculated based on each received packet, to verify that they match. The RSA may typically be computed after receipt of a first (or header) packet that may include the encryption signature and keys, although it may be performed at any convenient point during the process.

At operation 232, if another patch is to be downloaded, then the Stop-SHA flag is cleared at operation 234 in preparation for the next patch, and the process continues back at operation 202, where a new packet for the next patch download is received. Otherwise, at operation 236, a soft reset of the chip 110 is performed and the host is notified of the success or failure of the download. Although the term "soft reset" is used herein, in some embodiments, the soft reset may instead be a reset or any equivalent command that results in the application of the download patches. It will be appreciated that a single notification of success or failure, based on security verification, after completion of the patch download attempts, may limit the opportunity for potential breaches of security. This is in contrast to a system that reports security verification errors as they occur, (e.g., after each SHA secure computation), which could provide a greater number of clues to an unauthorized party (hacker, snooper, etc.) that gained access to the transport communications. It will be appreciated, however, that while the reporting of security verification errors may be delayed as described above, the reporting of transmission errors (e.g., due to transport conditions, for example detected by checksums or other similar mechanisms) may occur as they are detected.

Thus, as can be seen from the above description, in the case of relatively good transport conditions, where valid (error free) packets are received in sequence, the SHA computation proceeds most efficiently in parallel with other operations and completes in the shortest time. Under weaker transport conditions, where valid packets are transmitted out of sequence or retransmitted with identical content, or where the received packets are invalid (e.g., invalid CRC or checksum), the SHA computations may be temporarily suspended and therefore take somewhat longer to complete. Under still poorer transport conditions, however, initially transmitted bad packets are retransmitted with corrected contents causing the SHA computations to stop and forcing a re-computation of the SHA after all packets have been received. This case will take the longest time to complete.

Figure 3A:
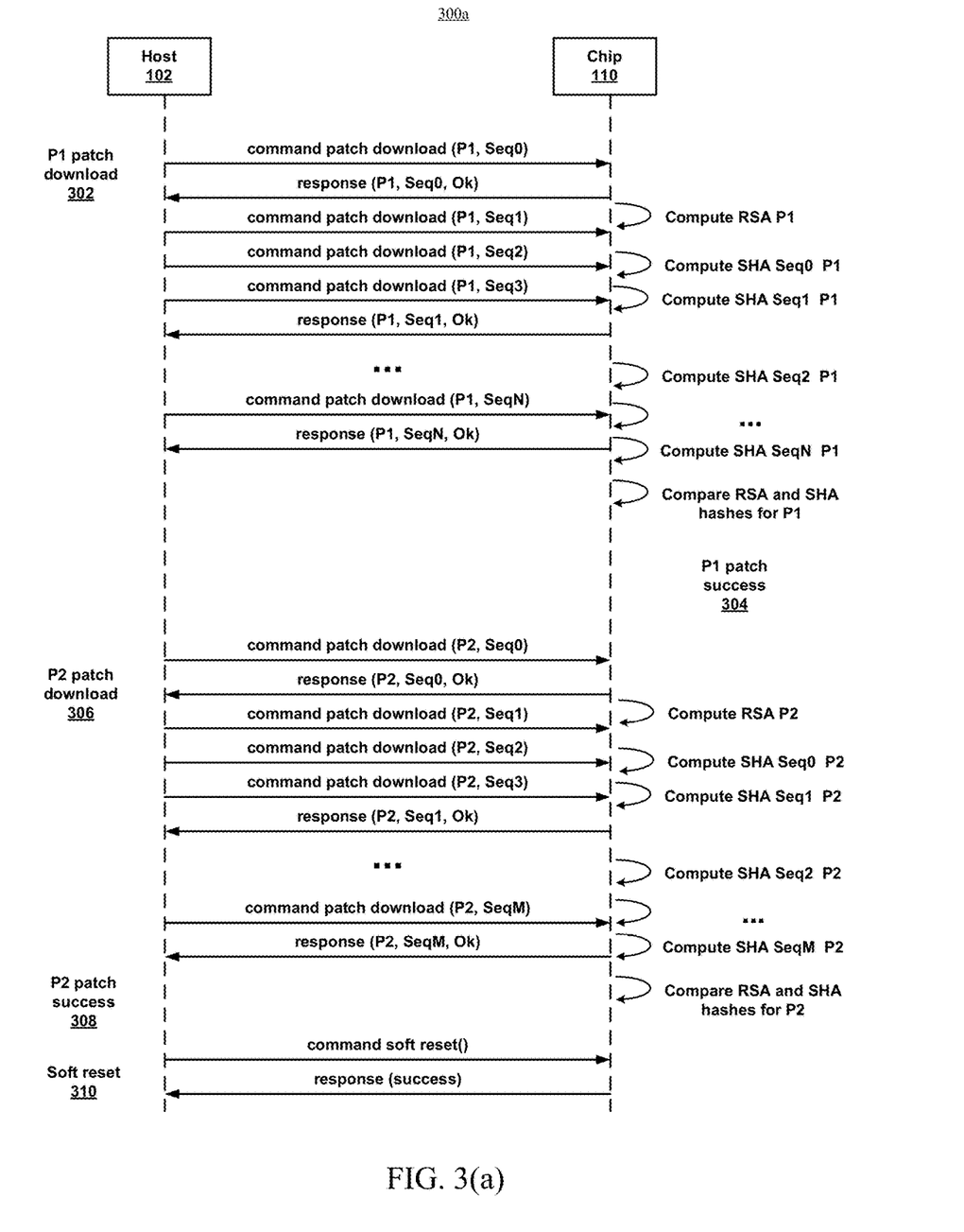
FIGS. 3(a) and 3(b) illustrate a message flow example of another embodiment consistent with the present disclosure.

FIG. 3(a) illustrates a message flow example 300 of another embodiment consistent with the present disclosure. In this example, a message flow is shown for the case of an error free transport (e.g., favorable transport conditions), and with packets received in sequential order, and a successful download of two patches. The message flow begins with the host 102 downloading a first patch P1 302 to chip 110. The patch download is transmitted as a sequence of packets (Seq0, . . . SeqN), also referred to as patch download commands Responses or acknowledgments are transmitted back to the host to indicate, in this case, that each packet was successfully received (e.g., without transmission error, but not yet security verified). The RSA is shown to be computed once for the patch, while the SHA is shown to be computed/updated for each packet. When the entire first patch has been downloaded, the P1 RSA and P1 SHA hashes are compared, and in this case match, to indicate a successful P1 patch download 304.

The process is then repeated for the second patch P2 download 306 that includes sequence of packets (Seq0, . . . SeqM) and corresponding acknowledgments. Here again the RSA is shown to be computed once for the patch, while the SHA computation is shown to be updated for each packet. When the entire second patch has been downloaded, the P2 RSA and P2 SHA hashes are compared, and in this case match, to indicate a successful P2 patch download 308. A soft reset of the chip 110 is then performed and the host is notified that a secure download was accomplished 310.

Because SHA computations were able to be performed in parallel with packet downloads, due to the error free nature of the transport in this example, the overall download time is reduced.

Figure 3B:
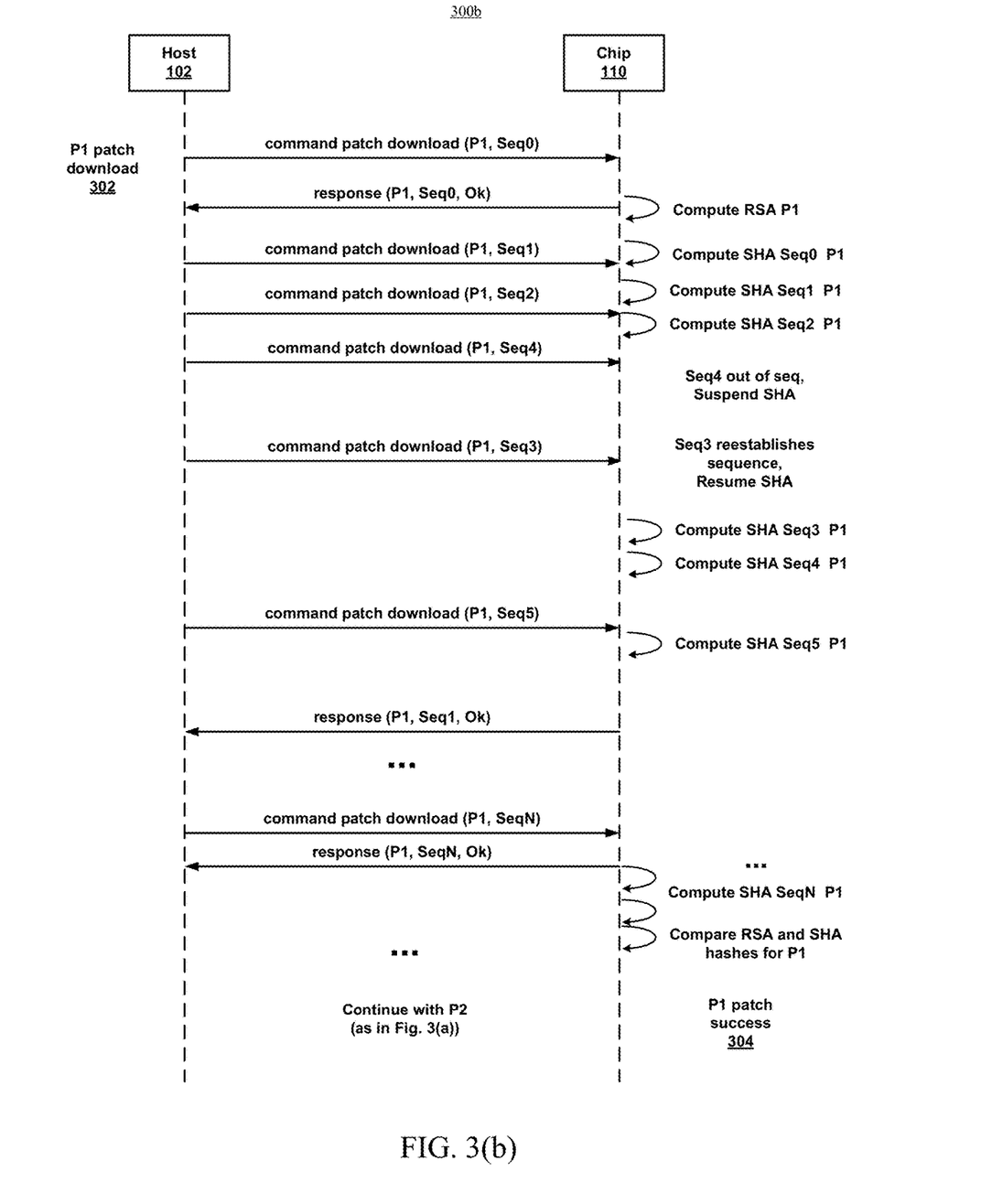

FIG. 3(b) is similar to FIG. 3(a) but illustrates an alternative scenario where packets of the P1 patch are downloaded out of sequence. In particular, in this example, the packet with sequence 4 is received after the packet with sequence 2, which results in the temporary suspension of SHA computation. When the packet with sequence 3 subsequently arrives, the sequence can now be reestablished and the SHA computation resumes to include packets 3 and 4. Processing continues from this point in the same manner as discussed with respect to FIG. 3(a) above. Other scenarios, not shown, may also result in the temporary suspension of SHA computations. For example, if a bad packet arrives (e.g., invalid CRC or checksum), the packet will be rejected and the SHA will be suspended for that transmission. Similarly, if a retransmitted packet arrives with content identical to the original packet, that packet will be rejected and the SHA will be suspended for that transmission.

Figure 4:
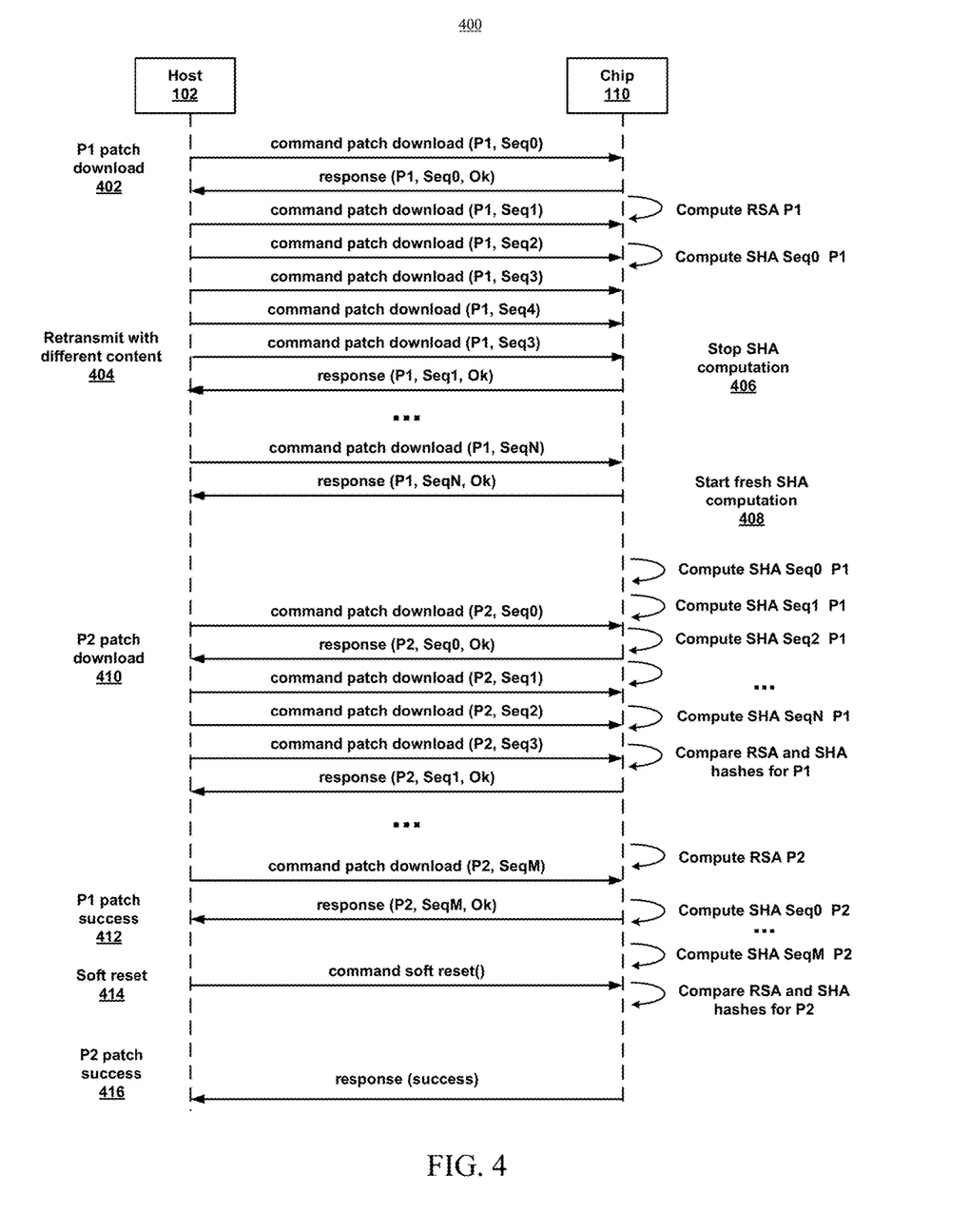
FIG. 4 illustrates a message flow example of another embodiment consistent with the present disclosure.

FIG. 4 illustrates a message flow example 400 of another embodiment consistent with the present disclosure. In this example, a message flow is shown for the case of a packet retransmission with different content than the original packet (e.g., perhaps due to less favorable transport conditions), while still achieving a successful download of two patches. The message flow begins with the host 102 downloading a first patch P1 402 to chip 110. The patch download is transmitted as a sequence of packets (Seq0, . . . SeqN). Responses or acknowledgments are transmitted back to the host. Packets with sequence numbers 0 through 4 are transmitted in order followed by a retransmission 404 of packet 3. In this case, however, the retransmitted packet has content that differs from the original transmission of packet 3. At this point SHA computations are stopped 406, because the cumulative computation of the SHA up to this point in time, which used the earlier version of packet 3, may be erroneous.

After all packets for patch P1 have been successfully received, a new (fresh) SHA computation is started 408, which takes additional time. The RSA is also shown to be computed once for the patch. At a later time (during the subsequent P2 patch download) the SHAs for each of the P1 sequences have been computed and then the P1 RSA and P1 SHA may be compared to indicate, in this case, a successful P1 patch download 412.

As mentioned above, the second patch P2 download 410, that includes sequence of packets (Seq0, . . . SeqM) has been started. Here again the RSA is shown to be computed once for the patch, while the SHA is shown to be computed/updated for each packet. When the entire second patch has been downloaded, the P2 RSA and P2 SHA hashes are compared, and in this case match, to indicate a successful P2 patch download 416. A soft reset of the chip 110 is also performed and the host is notified that a secure download was accomplished 414.

Figure 5:
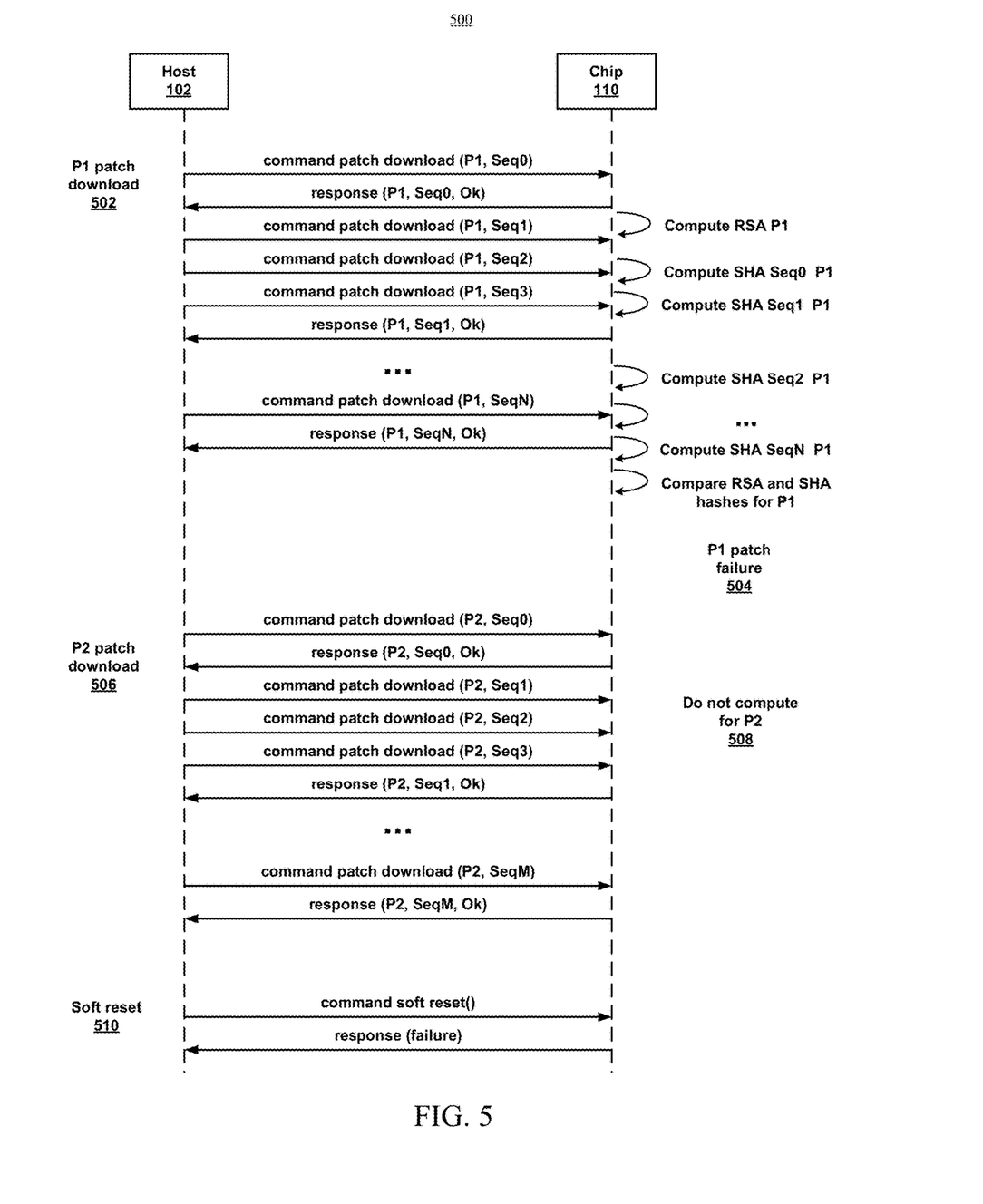
FIG. 5 illustrates a message flow example of another embodiment consistent with the present disclosure.

FIG. 5 illustrates a message flow example 500 of another embodiment consistent with the present disclosure. In this example, a message flow is shown for the case of an error free transport (e.g., favorable transport conditions) but an unsuccessful download. The message flow begins with the host 102 downloading a first patch P1 502 to chip 110. The patch download is transmitted as a sequence of packets (Seq0, . . . SeqN). Responses or acknowledgments are transmitted back to the host to indicate, in this case, that each packet was successfully received. The RSA is shown to be computed once for the patch, while the SHA is shown to be computed/updated for each packet. When the entire first patch has been downloaded, the P1 RSA and P1 SHA hashes are compared, but in this case do not match, to indicate an unsuccessful P1 patch download 504, likely associated with a security problem.

The process is then repeated for the second patch P2 download 506 that includes sequence of packets (Seq0, . . . SeqM) and corresponding acknowledgments. No security computations, either RSA or SHA are performed at this point 508, however, due to the earlier failure. A soft reset of the chip is then performed and the host is notified that the download failed 510.

Figure 6:
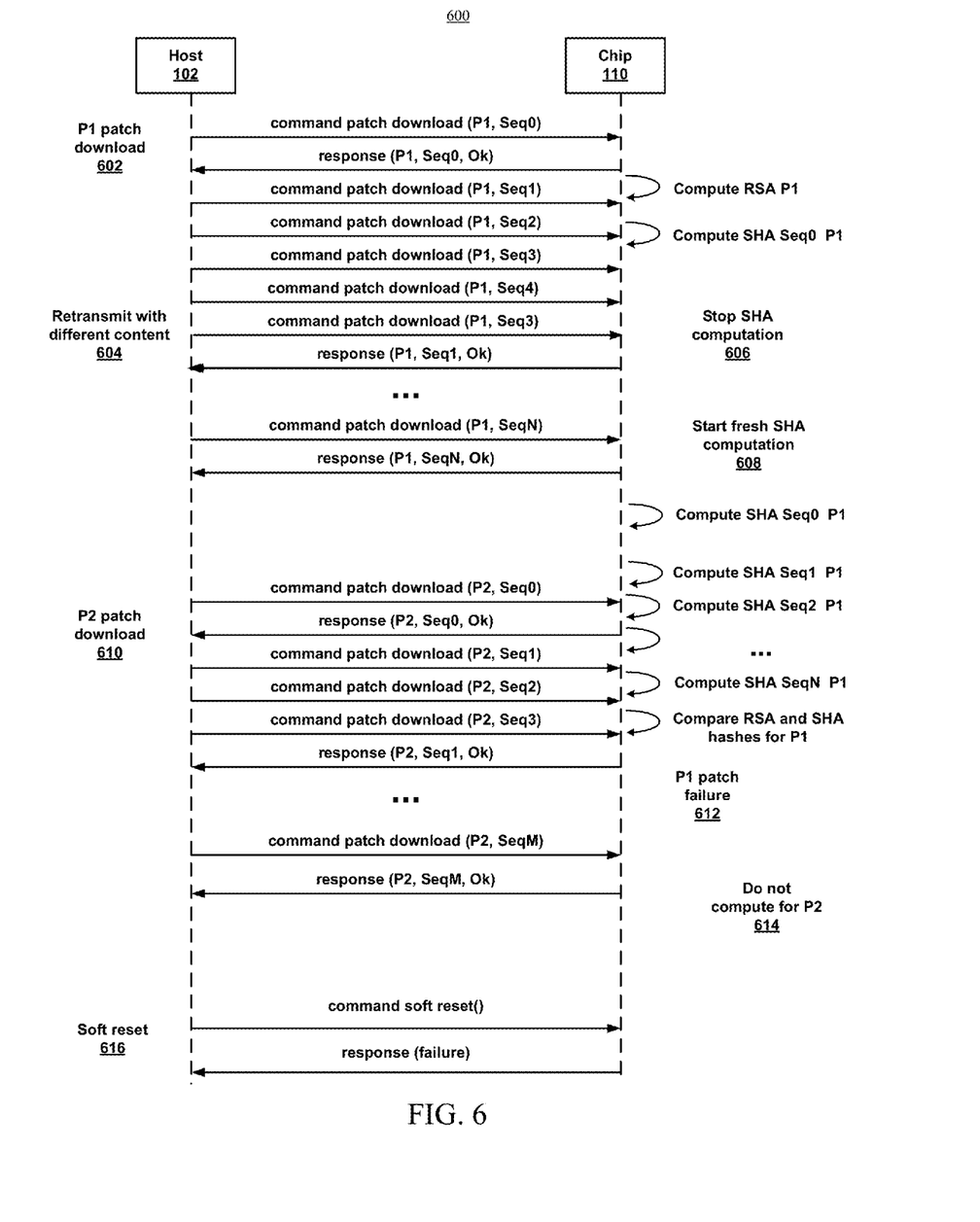
FIG. 6 illustrates a message flow example of another embodiment consistent with the present disclosure.

FIG. 6 illustrates a message flow example 600 of another embodiment consistent with the present disclosure. In this example, a message flow is shown for the case of a packet retransmission with different content than the original packet (e.g., perhaps due to less favorable transport conditions), along with an unsuccessful download. The message flow begins with the host 102 downloading a first patch P1 602 to chip 110. The patch download is transmitted as a sequence of packets (Seq0, ... SeqN). Responses or acknowledgments are transmitted back to the host. Packets with sequence numbers 0 through 4 are transmitted in order followed by a retransmission 604 of packet 3. In this case, however, the retransmitted packet has content that differs from the original transmission of packet 3. At this point SHA computations are stopped 606, because the cumulative computation of the SHA up to this point in time, which used the earlier version of packet 3, may be erroneous.

After all packets for patch P1 have been successfully received, a new (fresh) SHA computation is started 608, which takes additional time. The RSA is also shown to be computed once for the patch. At a later time (during the subsequent P2 patch download) the SHAs for each of the P1 sequences have been computed and then the P1 RSA and P1 SHA are compared, but in this case do not match, to indicate a P1 patch failure 612, likely associated with a security problem.

As mentioned above, the second patch P2 download 610, that includes sequence of packets (Seq0, ... SeqM) has been started. No security computations, either RSA or SHA are performed at this point 614 for P2, however, due to the earlier failure. A soft reset of the chip is then performed and the host is notified that the download failed 616.

Figure 7:
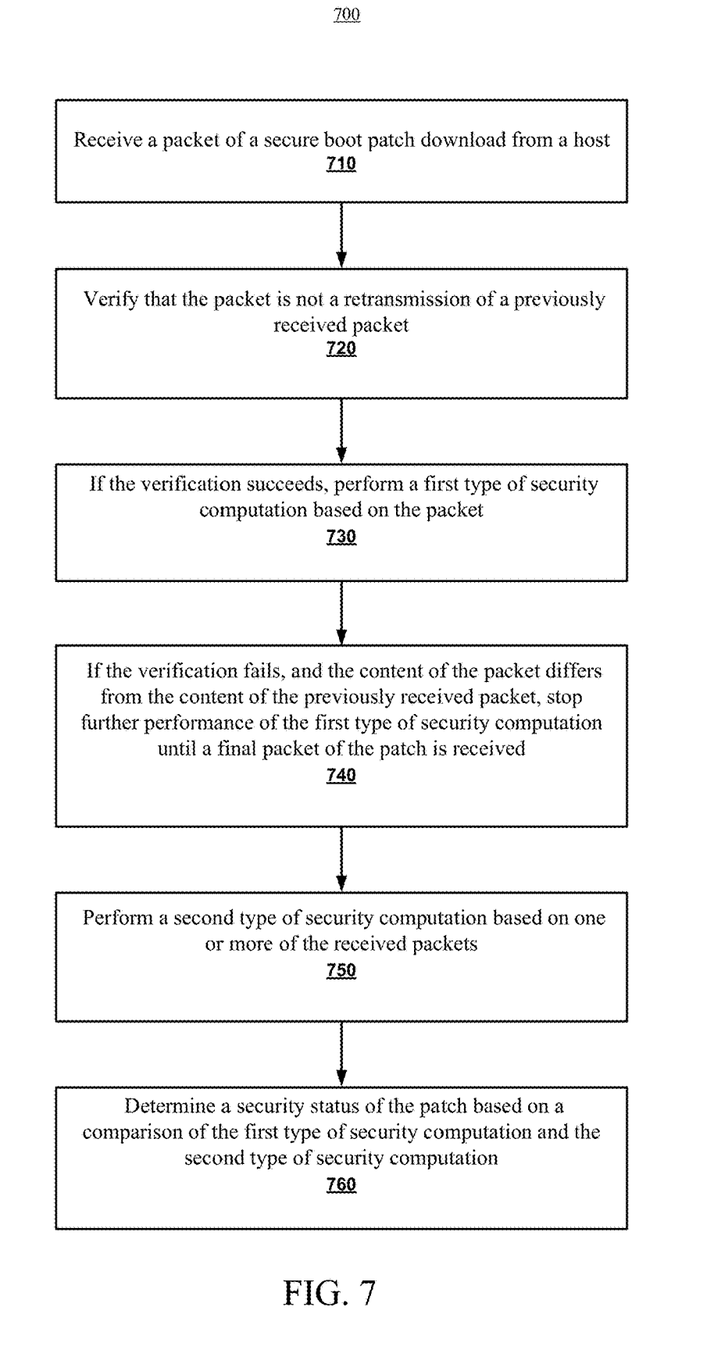
FIG. 7 illustrates a flowchart of operations of another example embodiment consistent with the present disclosure.

FIG. 7 illustrates a flowchart of operations 700 of another example embodiment consistent with the present disclosure. The operations provide a method for secure patch downloading from a host to a target, with improved security computation operations based on host transport conditions. At operation 710, a packet of a secure boot patch download is received. At operation 720, the packet is verified to determine that the packet is not a retransmission of a previously received packet. At operation 730, if the verification succeeds, a first type of security computation, based on the packet, is performed. At operation 740, if the verification fails and the content of the packet differs from the content of the previously received packet, further performance of the first type of security computation is stopped until a final packet of the patch is received. At operation 750, a second type of security computation, based on one or more of the received packets, is performed. At operation 760, a security status of the patch is determined based on a comparison of the first type of security computation and the second type of security computation.

Figure 8:
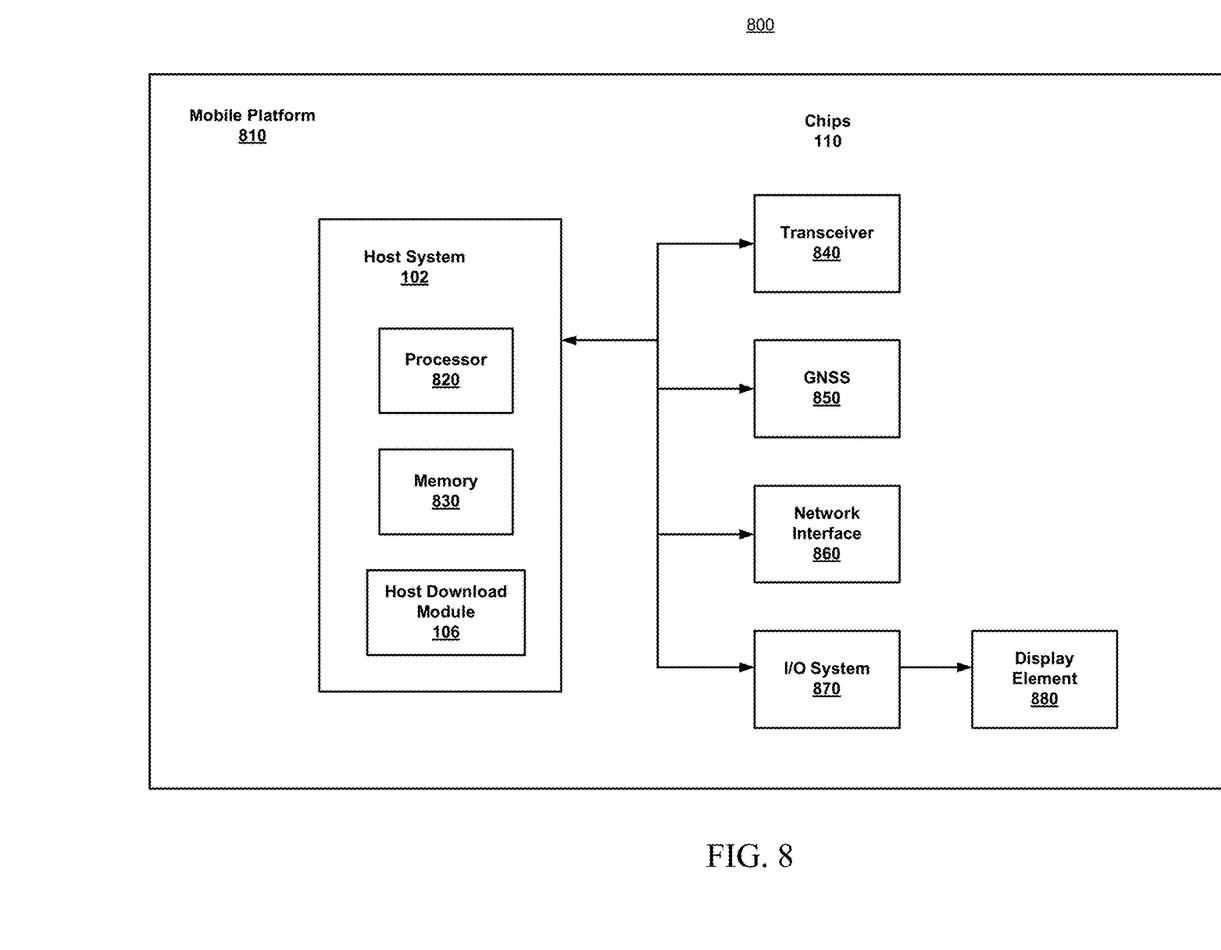
FIG. 8 illustrates a system diagram of a platform of another example embodiment consistent with the present disclosure.

FIG. 8 illustrates a system diagram 800 of one example embodiment consistent with the present disclosure. The system 800 may be a mobile platform 810 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 800 may be a workstation or desktop computer. The system may optionally present various interfaces to a user via a display element 880 such as, for example, a touch screen, liquid crystal display (LCD) or any other suitable display type.

The system 800 is shown to include a host system 102 that may further include any number of processors 820, memory 830 and host download module 106 (the operations of which have been described previously). In some embodiments, the processors 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 830 may be coupled to the processors and may include host buffers 104 as described previously. The memory 830 may be any of a wide variety of memories (including various layers of memory hierarchy and/or memory caches) as are known or otherwise available to those of skill in the art. It will be appreciated that the processors and memory may be configured to store, host and/or execute one or more user applications or other software modules. These applications may include, but not be limited to, for example, any type of computation, communication, data management, data storage and/or user interface task. In some embodiments, these applications may employ or interact with any other components of the mobile platform 810.

System 800 is also shown to include a number of examples of chips 110 which may be configured as targets for secure patch downloading as described previously. The chips 110 may include a transceiver 840, a GNSS module 850 and a network interface module 860 which may include wireless communication capabilities, such as, for example, cellular communications, Wireless Fidelity (WiFi), Bluetooth®, Near Field Communication (NFC) and/or any other communications technology, existing or yet to be developed. The wireless communications may conform to or otherwise be compatible with any existing or yet to be developed communication standards including past, current and future version of Bluetooth®, Wi-Fi and mobile phone communication standards.

System 800 is also shown to include an input/output (JO) system or controller 870 which may be configured to enable or manage data communication between processor 820 and other elements of system 800 or other elements (not shown) external to system 800.

It will be appreciated that in some embodiments, the various components of the system 800 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An application (or "app") may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip. In some embodiments, a module may thus be implemented in software and/or firmware and may comprise one or more processes, threads or subroutines of a single process. Additionally, in some embodiments, a module may be distributed and executed on separate devices.

Thus, the present disclosure provides systems, devices, methods and computer readable media for secure patch downloading from a host to a target, with improved security computation operations based on host transport conditions. The following examples pertain to further embodiments.

According to Example 1 there is provided a system for secure boot patch download from a host to a target. The system may include a target download module to verify that a packet of the patch received from the host is not a retransmission of a previously received packet and a secure boot engine. The secure boot engine may be configured to perform a first type of security computation based on the packet, if the verification succeeds; stop further performance of the first type of security computation until a final packet of the patch is received, if the verification fails and the content of the packet differs from the content of the previously received packet; perform a second type of security computation based on one or more of the received packets; and determine a security status of the patch based on a comparison of the first type of security computation and the second type of security computation.

Example 2 may include the subject matter of Example 1, and the target download module is further to detect that the packet is received out of a sequential order relative to previously received packets; and the secure boot engine is further to suspend performance of the first type of security computation on the packet, in response to the detection, the suspension to continue until one or more subsequent packets are received to reestablish the packet as being in sequence.

Example 3 may include the subject matter of Examples 1 and 2, and the secure boot engine further includes a Secure Hash Algorithm (SHA) computation module to perform the first type of security computation.

Example 4 may include the subject matter of Examples 1-3, and the secure boot engine further includes a Rivest Shamir Adelman Algorithm (RSA) computation module to perform the second type of security computation.

Example 5 may include the subject matter of Examples 1-4, and the target download module is further to download one or more additional boot patches.

Example 6 may include the subject matter of Examples 1-5, and the target download module is further to, after completing all of the boot patch downloads, report the security status to the host.

Example 7 may include the subject matter of Examples 1-6, and the target download module is further to perform a reset of the target to reboot the target based on the downloaded secure boot patch.

Example 8 may include the subject matter of Examples 1-7, further including a physical transport coupling the host and the target and through which the packet is received, and the physical transport is a Universal Asynchronous Receiver/Transmitter (UART), a Serial Peripheral Interface (SPI), a Universal Serial Bus (USB) or an Inter-Integrated Circuit bus (I2C).

According to Example 9 there is provided a method for secure boot patch download from a host to a target. The method may include: verifying that a packet of the patch received from the host is not a retransmission of a previously received packet; if the verification succeeds, performing a first type of security computation based on the packet; if the verification fails, and the content of the packet differs from the content of the previously received packet, stopping further performance of the first type of security computation until a final packet of the patch is received; performing a second type of security computation based on one or more of the received packets; and determining a security status of the patch based on a comparison of the first type of security computation and the second type of security computation.

Example 10 may include the subject matter of Example 9, further including: detecting that the packet is received out of a sequential order relative to previously received packets; and suspending performance of the first type of security computation on the packet, in response to the detection, the suspension to continue until one or more subsequent packets are received to reestablish the packet as being in sequence.

Example 11 may include the subject matter of Examples 9 and 10, and the first type of security computation is a Secure Hash Algorithm (SHA) computation.

Example 12 may include the subject matter of Examples 9-11, and the second type of security computation is a Rivest Shamir Adelman Algorithm (RSA) computation.

Example 13 may include the subject matter of Examples 9-12, further including repeating the operations for one or more additional boot patch downloads.

Example 14 may include the subject matter of Examples 9-13, further including, after completing all of the boot patch downloads, reporting the security status to the host.

Example 15 may include the subject matter of Examples 9-14, further including performing a reset of the target to reboot the target based on the downloaded secure boot patch.

Example 16 may include the subject matter of Examples 9-15, further including receiving the packet from the host over a physical transport, and the physical transport is a Universal Asynchronous Receiver/Transmitter (UART), a Serial Peripheral Interface (SPI), a Universal Serial Bus (USB) or an Inter-Integrated Circuit bus (I2C).

According to Example 17 there is provided at least one computer-readable storage medium having instructions stored thereon which when executed by a processor result in the following operations for secure boot patch download from a host to a target. The operations may include: verifying that a packet of the patch received from the host is not a retransmission of a previously received packet; if the verification succeeds, performing a first type of security computation based on the packet; if the verification fails, and the content of the packet differs from the content of the previously received packet, stopping further performance of the first type of security computation until a final packet of the patch is received; performing a second type of security computation based on one or more of the received packets; and determining a security status of the patch based on a comparison of the first type of security computation and the second type of security computation.

Example 18 may include the subject matter of Example 17, further including: detecting that the packet is received out of a sequential order relative to previously received packets; and suspending performance of the first type of security computation on the packet, in response to the detection, the suspension to continue until one or more subsequent packets are received to reestablish the packet as being in sequence.

Example 19 may include the subject matter of Examples 17 and 18, and the first type of security computation is a Secure Hash Algorithm (SHA) computation.

Example 20 may include the subject matter of Examples 17-19, and the second type of security computation is a Rivest Shamir Adelman Algorithm (RSA) computation.

Example 21 may include the subject matter of Examples 17-20, further including repeating the operations for one or more additional boot patch downloads.

Example 22 may include the subject matter of Examples 17-21, further including, after completing all of the boot patch downloads, reporting the security status to the host.

Example 23 may include the subject matter of Examples 17-22, further including performing a reset of the target to reboot the target based on the downloaded secure boot patch.

Example 24 may include the subject matter of Examples 17-23, further including receiving the packet from the host over a physical transport, and the physical transport is a Universal Asynchronous Receiver/Transmitter (UART), a Serial Peripheral Interface (SPI), a Universal Serial Bus (USB) or an Inter-Integrated Circuit bus (I2C).

According to Example 25 there is provided a system for secure boot patch download from a host to a target. The system may include: means for verifying that a packet of the patch received from the host is not a retransmission of a previously received packet; means for, if the verification succeeds, performing a first type of security computation based on the packet; means for, if the verification fails, and the content of the packet differs from the content of the previously received packet, stopping further performance of the first type of security computation until a final packet of the patch is received; means for performing a second type of security computation based on one or more of the received packets; and means for determining a security status of the patch based on a comparison of the first type of security computation and the second type of security computation.

Example 26 may include the subject matter of Example 25, further including: means for detecting that the packet is received out of a sequential order relative to previously received packets; and means for suspending performance of the first type of security computation on the packet, in response to the detection, the suspension to continue until one or more subsequent packets are received to reestablish the packet as being in sequence.

Example 27 may include the subject matter of Examples 25 and 26, and the first type of security computation is a Secure Hash Algorithm (SHA) computation.

Example 28 may include the subject matter of Examples 25-27, and the second type of security computation is a Rivest Shamir Adelman Algorithm (RSA) computation.

Example 29 may include the subject matter of Examples 25-28, further including means for repeating the operations for one or more additional boot patch downloads.

Example 30 may include the subject matter of Examples 25-29, further including means for reporting the security status to the host, after completing all of the boot patch downloads.

Example 31 may include the subject matter of Examples 25-30, further including means for performing a reset of the target to reboot the target based on the downloaded secure boot patch.

Example 32 may include the subject matter of Examples 25-31, further including means for receiving the packet from the host over a physical transport, and the physical transport is a Universal Asynchronous Receiver/Transmitter (UART), a Serial Peripheral Interface (SPI), a Universal Serial Bus (USB) or an Inter-Integrated Circuit bus (I2C).

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for secure download of a boot patch that includes a plurality of packets from a host device to a target device, said system comprising:
    target download circuitry to determine whether each packet included in the plurality of packets received from the host is a valid packet; and
    secure boot engine circuitry communicably coupled to said target download circuitry, said secure boot engine circuitry to, as each valid packet included in the plurality of packets is received at the target device:
        determine a packet security value associated with the valid packet by performing a first type of security computation on the valid packet; and
        determine a first patch security value associated with the boot patch based on each determined packet security value;
    wherein the secure boot engine circuitry is further to:
        determine a second patch security value associated with the boot patch by performing a second type of security computation based on one or more of received valid packets; and
        upon receipt of all packets included in the plurality of packets at the target device, determine a security status of the boot patch based on a comparison of the first patch security value and the second patch security value,
    wherein said target download circuitry is further to download one or more additional boot patches, and said target download circuitry is further to, after completing all of said boot patch downloads, report said security status to said host device.

2. The system of claim 1, wherein the target download circuitry is further to verify that each packet included in said plurality of packets received from said host is not a retransmission of a packet previously received from the host.

3. The system of claim 2, wherein the secure boot engine circuitry is further to:
determine, when said packet is verified using a sequence number as a non-retransmitted packet, said first patch security value; and
when said packet is verified using said sequence number as a retransmitted packet, stop further performance of said first type of security computation on each respective one of said packets included in said plurality of packets upon receipt of said packet at said target device.

4. The system of claim 2, wherein said secure boot engine circuitry is further to:
determine, when said packet is verified using a sequence number as a non-retransmitted packet, said first patch security value; and
when said packet is verified using said sequence number as a retransmitted packet and said packet includes content that differs from content included said previously received packet, stop further performance of said first type of security computation on each respective one of said packets included in said plurality of packets upon receipt of said packet at said target device.

5. The system of claim 1, wherein the target download circuitry is to:
determine whether each packet included in the plurality of packets is valid based at least in part by determining whether each packet included in the plurality of packets contains an error; and
when a packet of said plurality of packets contains an error, determine that said packet is an invalid packet.

6. The system of claim 1, wherein:
said target download circuitry is further to detect whether each of said plurality of packets is received out of a sequential order relative to previously received packets; and
said secure boot engine circuitry is further to suspend performance of said first type of security computation on said packet, in response to said detection, said suspension to continue until one or more subsequent packets are received to reestablish said packet as being in sequence.

7. The system of claim 1, wherein said secure boot engine circuitry further comprises Secure Hash Algorithm (SHA) computation circuitry to perform said first type of security computation.

8. The system of claim 1, wherein said secure boot engine circuitry further comprises Rivest Shamir Adelman Algorithm (RSA) computation circuitry to perform said second type of security computation.

9. A method for secure download of a boot patch that includes a plurality of packets from a host device to a target device, said method comprising:
determining, with target download circuitry, whether each packet included in the plurality of packets received from the host is a valid packet;
determining, with secure boot engine circuitry communicably coupled to said target download circuitry and as each valid packet included in the plurality of packets is received at the target device:
a packet security value associated with the valid packet by performing a first type of security computation on the valid packet; and
a first patch security value associated with the boot patch based on each determined packet security value;
with said secure boot engine circuitry:
determining a second patch security value associated with the boot patch by performing a second type of security computation based on one or more of received valid packets; and
upon receipt of all packets included in the plurality of packets at the target device, determining a security status of the boot patch based on a comparison of the first patch security value and the second patch security value; and
with said target download circuitry:
downloading one or more additional boot patches; and
after completing all of said boot patch downloads, reporting said security status to said host device.

10. The method of claim 9, further comprising verifying, with said target download circuitry, that each packet included in said plurality of packets received from said host is not a retransmission of a packet previously received from the host.

11. The method of claim 10, further comprising, with said secure boot engine circuitry:
determining, when said packet is verified using a sequence number as a non-retransmitted packet, said first patch security value; and
when said packet is verified using said sequence number as a retransmitted packet, ceasing further performance of said first type of security computation on each respective one of said packets included in said plurality of packets upon receipt of said packet at said target device.

12. The method of claim 9, further comprising:
detecting, with said target download circuitry, whether each of said plurality of packets is received out of a sequential order relative to previously received packets; and
suspending, with said secure boot engine circuitry, performance of said first type of security computation on said packet when a packet of said plurality of packets is received out of order, said suspension to continue until one or more subsequent packets are received to reestablish said packet as being in sequence.

13. The method of claim 9, wherein said secure boot engine circuitry comprises Secure Hash Algorithm (SHA) computation circuitry to perform said first type of security computation.

14. The method of claim 9, wherein said secure boot engine circuitry comprises Rivest Shamir Adelman Algorithm (RSA) computation circuitry to perform said second type of security computation.

15. A non-transitory computer-readable storage medium having instructions stored thereon which when executed by a processor result in the following operations for secure download of a boot patch that includes a plurality of packets from a host device to a target device, said operations comprising:
determining, with target download circuitry, whether each packet included in the plurality of packets received from the host is a valid packet;
determining, with secure boot engine circuitry communicably coupled to said target download circuitry and as each valid packet included in the plurality of packets is received at the target device:

a packet security value associated with the valid packet by performing a first type of security computation on the valid packet; and a first patch security value associated with the boot patch based on each determined packet security value; and with said secure boot engine circuitry:

determining a second patch security value associated with the boot patch by performing a second type of security computation based on one or more of received valid packets; and upon receipt of all packets included in the plurality of packets at the target device, determining a security status of the boot patch based on a comparison of the first patch security value and the second patch security value; and with said target download circuitry:

downloading one or more additional boot patches; and after completing all of said boot patch downloads, reporting said security status to said host device.

16. The non-transitory computer-readable storage medium of claim 15, wherein said instructions when executed further result in the performance of the following operations comprising:

verifying, with said target download circuitry, that each packet included in said plurality of packets received from said host is not a retransmission of a packet previously received from the host.

17. The non-transitory computer-readable storage medium of claim 15, wherein said instructions when executed further result in the performance of the following operations comprising, with said secure boot engine circuitry:

determining, when said packet is verified using a sequence number as a non-retransmitted packet, said first patch security value; and when said packet is verified using said sequence number as a retransmitted packet, ceasing further performance of said first type of security computation on each respective one of said packets included in said plurality of packets upon receipt of said packet at said target device.

18. The non-transitory computer-readable storage medium of claim 15, wherein said instructions when executed further result in the performance of the following operations comprising, with said target download circuitry:

determining whether each packet included in the plurality of packets is valid based at least in part by determining whether each packet included in the plurality of packets contains an error; and when a packet of said plurality of packets contains an error, determining that said packet is an invalid packet.

19. The non-transitory computer-readable storage medium of claim 15, wherein said instructions when executed further result in the performance of the following operations comprising:

detecting, with said target download circuitry, whether each of said plurality of packets is received out of a sequential order relative to previously received packets; and suspending, with said secure boot engine circuitry, performance of said first type of security computation on said packet when a packet of said plurality of packets is received out of order, said suspension to continue until one or more subsequent packets are received to reestablish said packet as being in sequence.

20. The non-transitory computer-readable storage medium of claim 15, wherein said secure boot engine circuitry comprises Secure Hash Algorithm (SHA) computation circuitry to perform said first type of security computation.

21. The non-transitory computer-readable storage medium of claim 15, wherein said secure boot engine circuitry comprises Rivest Shamir Adelman Algorithm (RSA) computation circuitry to perform said second type of security computation.

* * * * *